(12) United States Patent
Kanaya et al.

(10) Patent No.: US 11,563,656 B2
(45) Date of Patent: Jan. 24, 2023

(54) STATE MONITORING DEVICE, STATE MONITORING SYSTEM, AND STATE MONITORING METHOD

(71) Applicant: NEC Corporation, Tokyo (JP)

(72) Inventors: Naoki Kanaya, Tokyo (JP); Yuichi Imamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/965,928

(22) PCT Filed: Mar. 13, 2019

(86) PCT No.: PCT/JP2019/010167
§ 371 (c)(1),
(2) Date: Jul. 29, 2020

(87) PCT Pub. No.: WO2019/181674
PCT Pub. Date: Sep. 26, 2019

(65) Prior Publication Data
US 2021/0083955 A1    Mar. 18, 2021

(30) Foreign Application Priority Data
Mar. 19, 2018    (JP) .............................. JP2018-051208

(51) Int. Cl.
*G06F 15/173* (2006.01)
*H04L 43/065* (2022.01)
(Continued)

(52) U.S. Cl.
CPC ............ *H04L 43/065* (2013.01); *H04L 43/08* (2013.01); *H04W 24/08* (2013.01); *H04W 76/10* (2018.02)

(58) Field of Classification Search
CPC ...... H04L 43/065; H04L 43/08; H04W 76/10; H04W 24/08
See application file for complete search history.

(56) References Cited

U.S. PATENT DOCUMENTS 7,865,584 B2 * 1/2011 Grossner ................. H04L 43/00
  709/223
2011/0276823 A1 * 11/2011 Ueno ................... G06F 11/1464
  714/E11.073
(Continued)

FOREIGN PATENT DOCUMENTS

CN    205195721 U    4/2016
CN    106710184 A    5/2017
(Continued)

OTHER PUBLICATIONS

International Search Report dated Jun. 18, 2019, in corresponding PCT international Application.
(Continued)

*Primary Examiner* — Hannah S Wang
*Assistant Examiner* — Tesfu N Mekonen

(57) ABSTRACT

The present invention provides a state monitoring device which make it possible to certainly deliver, to the maintenance staff side, state monitoring information of an apparatus to be monitored which is disposed in a distant place with a bad communication environment. A state monitoring device 300 is provided with a communication unit 301 which performs communication using a first communication line for transmitting operating information of an apparatus to be monitored to a server device, and a second communication line for transmitting the operating information to the server device via wireless communication provided by a mobile object if the first communication line is not communicable.

11 Claims, 16 Drawing Sheets

(51) Int. Cl.
*H04W 76/10* (2018.01)
*H04L 43/08* (2022.01)
*H04W 24/08* (2009.01)

(56) References Cited

U.S. PATENT DOCUMENTS

| | | | |
|---|---|---|---|
| 2012/0317278 A1* | 12/2012 | Tamaki | H04L 1/0018 |
| | | | 709/224 |
| 2015/0070187 A1* | 3/2015 | Wiesner | A61B 5/0022 |
| | | | 340/870.02 |
| 2015/0099534 A1* | 4/2015 | Nagata | H04W 64/003 |
| | | | 455/456.1 |
| 2016/0209074 A1* | 7/2016 | Ito | F04D 27/001 |
| 2016/0226732 A1* | 8/2016 | Kim | H04L 12/2807 |
| 2018/0014212 A1* | 1/2018 | Oga | H04M 3/2254 |
| 2018/0279203 A1* | 9/2018 | da Silva | H04W 48/10 |
| 2019/0102732 A1* | 4/2019 | Sauerwein, Jr. | H04W 4/80 |

FOREIGN PATENT DOCUMENTS

| | | |
|---|---|---|
| JP | H 09-238199 A | 9/1997 |
| JP | 2002-198887 A | 7/2002 |
| JP | 2006-165627 A | 6/2006 |
| JP | 2006-275303 A | 10/2006 |
| JP | 2017-054202 A | 3/2017 |
| JP | 2017-069803 A | 4/2017 |
| JP | 2017-155557 A | 9/2017 |
| JP | 2017-169093 A | 9/2017 |
| JP | 2017-195493 A | 10/2017 |
| WO | 2017/150359 A1 | 9/2017 |
| WO | 2017/156836 A1 | 9/2017 |
| WO | WO 2017/158706 A1 | 9/2017 |

OTHER PUBLICATIONS

Extended European Search Report for EP Application No. 19770987.6 dated Mar. 19, 2021.

* cited by examiner

Fig. 3

| COMMUNICATION SPEED | SEVERITY OF FAULT | | |
|---|---|---|---|
| | SEVERE | SLIGHT | UNKNOWN |
| FAST | ALL DATA | ALL DATA | ALL DATA |
| NORMAL | ONLY PART | ONLY PART | ALL DATA |
| SLOW | ONLY PART | ONLY PART | ONLY PART |

STATE MONITORING DEVICE, STATE MONITORING SYSTEM, AND STATE MONITORING METHOD

CROSS-REFERENCE TO RELATED PATENT APPLICATIONS

This application is a National Stage Entry of International Application No. PCT/JP2019/010167, filed Mar. 13, 2019, which claims priority from Japanese Patent Application No. 2018-051208, filed Mar. 19, 2018. The entire contents of the above-referenced applications are expressly incorporated herein by reference.

TECHNICAL FIELD

The present invention relates to a state monitoring device for certainly monitoring a state of a target apparatus.

BACKGROUND ART

In recent years, a system constituted of various devices or a plurality of devices is connected to an Internet communication (including a cloud), and thus, a maintenance worker is able to remotely monitor an operation state of the system. During a fault of the system, the maintenance worker can perform a primary analysis of a cause of the fault by checking, via the cloud, information on or an operation log of the faulty device, without going to an installation place of the device. Consequently, even when needing to go to the installation place for repair, the maintenance worker can prepare information needed for the repair in advance.

As a related technique, PTL 1 discloses a technique for monitoring and determining deterioration of a power storage system. PTL 2 discloses a technique of causing a user to perform selection regarding a trouble state of a home appliance via a portable terminal, and analyzing a trouble on a server side, based on a result of the selection. PTL 3 discloses a technique of sensing an abnormality in an air examination device in consideration of a state.

CITATION LIST

Patent Literature

[PTL 1] International Publication No. WO2017/158706
[PTL 2] Japanese Unexamined Patent Application Publication No. 2017-054202
[PTL 3] Japanese Unexamined Patent Application Publication No. 2006-275303

SUMMARY OF INVENTION

Technical Problem

However, the techniques disclosed by PTLs 1 to 3 are premised on a place or a country where a communication environment such as the Internet is provided, and do not consider that a device or a system to be a target for monitoring is installed in a place where a communication environment is poor or in an area where infrastructure is not provided.

In view of the problem described above, an object of the present invention is to provide a state monitoring device that are able to certainly deliver, to a maintenance worker side, state monitoring information of an apparatus to be monitored being disposed in a remote place where a communication environment is poor.

Solution to Problem

In view of the problem described above, a state monitoring device according to a first aspect of the present invention includes:

a communication means for performing a communication by using a first communication line for transmitting, to a server device, operating information of a target apparatus to be monitored, and a second communication line for transmitting the operating information to the server device via a wireless communication provided by a mobile object when the first communication line is not communicable.

A state monitoring system according to a second aspect of the present invention includes:

the state monitoring device described above;

a mobile object that connects a wireless communication by moving to a position where the mobile object is wirelessly communicable with the state monitoring device, when operating information of a target apparatus to be monitored by the state monitoring device is not transmittable via a first communication line; and a server device that receives the operating information between a local device and the state monitoring device via a second communication line using the wireless communication.

A state monitoring method according to a third aspect of the present invention includes:

performing a communication by using a first communication line for transmitting, to a server device, operating information of a target apparatus to be monitored, and a second communication line for transmitting the operating information to the server device via a wireless communication provided by a mobile object when the first communication line is not communicable.

A state monitoring program according to a fourth aspect of the present invention causes a computer to achieve performing a communication by using a first communication line for transmitting, to a server device, operating information of a target apparatus to be monitored, and a second communication line for transmitting the operating information to the server device via a wireless communication provided by a mobile object when the first communication line is not communicable.

A state monitoring program may be stored in a non-transitory computer-readable storage medium.

Advantageous Effects of Invention

According to the present invention, a state monitoring device that can certainly deliver, to a maintenance worker side, state monitoring information of an apparatus to be monitored being disposed in a remote place where a communication environment is poor are able to be provided.

BRIEF DESCRIPTION OF DRAWINGS

FIG. 3 is a diagram illustrating an example of a table for determining a data amount to be transmitted.

EXAMPLE EMBODIMENT

Figure 1:
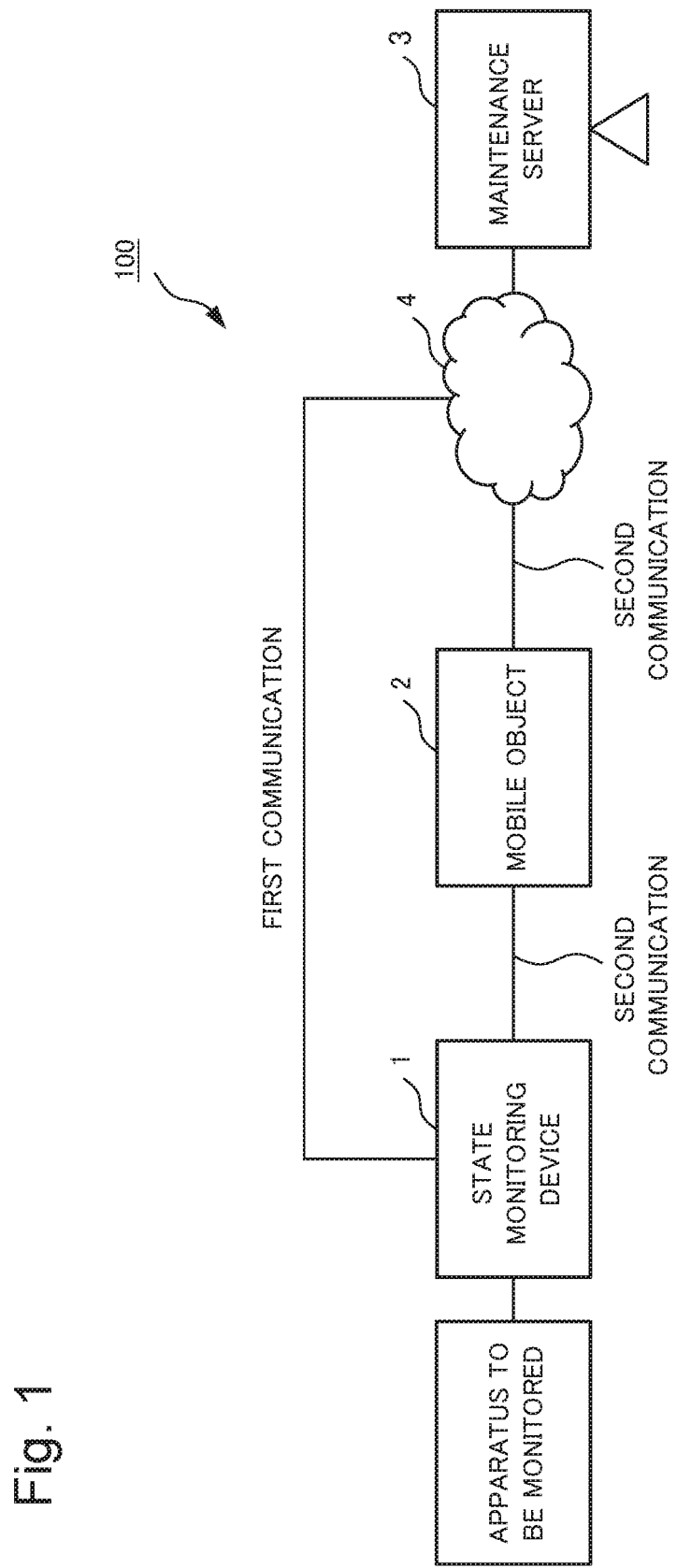
FIG. 1 is a block diagram illustrating a configuration example of a state monitoring system according to a first example embodiment of the present invention.

In a case of a system (e.g., electricity, communication, or water) involved in a lifeline of peoples, the system is unstoppable all day in principle, and maintenance or monitoring of the system is necessary. When the system is remotely maintained, a maintenance worker receives information on the system via a communication network, and, when a failure occurs, a measure for recovery from the failure is implemented. For this, a premise is that a communication environment for transmitting and receiving operating status of the system is developed. However, a system to be a target for maintenance may be installed in a place where a communication environment is poor.

For example, a power battery system prepared for a time when emergency occurs in an electric power system such as a communication base station may be installed in such a place as a bosom of mountains where a communication environment is poor. Alternatively, a power battery system may be installed in an area where infrastructure is not developed, such as an area where power failures occur several times a day. In such a case, once a communication network is interrupted, information relating to operating status of a monitoring target system is unavailable to a maintenance worker, and, even though the system is at fault, the maintenance worker is not able to immediately know the occurrence of the fault or a cause of the fault. Therefore, an alternative of a communication for certainly transmitting, to a maintenance worker side, information on a monitoring target system even in a place where a communication environment is poor is required.

In a monitoring target system, for example, a power battery system disposed in a place where a communication environment is poor, a maintenance worker visits an installation place and then sets a schedule for a device disposed in a place where a communication environment is poor, when achieving a scheduled operation with suppressed electric output requested from an electric power company, Becoming able to remotely perform, via a communication, setting for a device existing in a place where a communication environment is poor even in a case of maintenance of such schedule setting lightens a work burden of the maintenance worker.

For this, a system is needed that develops a communication environment even temporarily during transmission of operating status check data or schedule setting of a monitoring target system even in a place where a communication environment is poor. In the following example embodiments, a system for achieving the above are described.

Each example embodiment of the present invention is described below with reference to the drawings. In the description of the drawings below, the same or a similar reference sign is given to the same or a similar part. The drawings each schematically represent a configuration in each example embodiment of the present invention. Further, each example embodiment of the present invention described below is one example, and is suitably changeable within the same essence thereof.

First Example Embodiment (State Monitoring System)

As illustrated in FIG. 1 (an overall system diagram), a state monitoring system 100 according to a first example embodiment includes a state monitoring device 1, a mobile object 2, and a maintenance server 3. The state monitoring device 1 is communicably connected to inside or outside of an apparatus to be monitored (e.g., a power battery system), and monitors an operating state of the apparatus to be monitored. The state monitoring device 1 is normally connected to a network 4 (e.g., the Internet), and transmits the operating state of the apparatus to be monitored to the maintenance server 3 via the network 4 as operating information (this is also referred to as a first communication).

When communication connection between the state monitoring device 1 and the network 4 is cut off by occurrence of some abnormality, and a communication between the state monitoring device 1 and the maintenance server 3 is interrupted, the state monitoring device 1 requests the mobile object 2 for wireless communication connection. The mobile object 2 is a terminal being capable of movement and wireless communication, and a drone having a wireless communication function in a case of a flight-based mobile object, or a small-sized vehicle having a wireless communication function in a case of a land-based mobile object falls under the mobile object 2, for example. The mobile object 2 transmits operating information of the state monitoring device received via a wireless communication to the maintenance server 3 via the network 4 (this is also referred to as a second communication). In a case of an environment where a communication is always unstable, the mobile object 2 may be set in such a way as to move (circulate) around the state monitoring device 1 at a predetermined interval.

The mobile object 2 is not limited to the above, and may be, for example, a smartphone or a personal computer having a wireless communication function. In this case, a smartphone or personal computer being present in a place where the smartphone or personal computer is wirelessly communicable with the state monitoring device 1 by use of, for example, a global positioning system (GPS) is detected, and the detected smartphone or personal computer is requested to transmit, to the network 4, operating information of a target apparatus by use of, for example, a tethering function.

The maintenance server 3 analyzes operating information received from the state monitoring device 1 side, and analyzes the operating state of the apparatus to be monitored. When a communication between the state monitoring device 1 and the maintenance server 3 is interrupted, not only the state monitoring device 1 but also the maintenance server 3 may sense the interruption, and request the mobile object 2 to connect a wireless communication by moving to a position where a wireless communication with the state monitoring device 1 is possible. The maintenance server 3 may be a server (cloud server) formed in a cloud environment.

A wireless communication provided by the network 4 and the mobile object 2 may be any kind of communication. For example, the wireless communication is near-field wireless such as a near-field communication (NFC), a wireless personal area network (PAN) such as Bluetooth (registered trademark), a wireless local area network (LAN) such as wireless fidelity (Wi-Fi; registered trademark), or wireless metropolitan area network (MAN) such as WiMax. The mobile object 2 may be equipped with a plurality of kinds of wireless communication functions. For example, it is assumed that the mobile object 2 has three communication functions including a wireless LAN, a wireless PAN, and near-field wireless. In this case, when a communication via the wireless LAN is unstable between the mobile object 2 and the state monitoring device 1, the mobile object 2 moves itself to a position closer to the state monitoring device 1, and acquires operating information from the state monitoring device 1 via the wireless PAN or the near-field wireless. After acquiring the operating information, the mobile object 2 moves itself to a position where the mobile object 2 is communicable with the network 4 via a wireless LAN or a wireless MAN, and transmits the acquired operating information to the maintenance server 3 side.

Next, each component is described in detail.

(State Monitoring Device)

Figure 2:
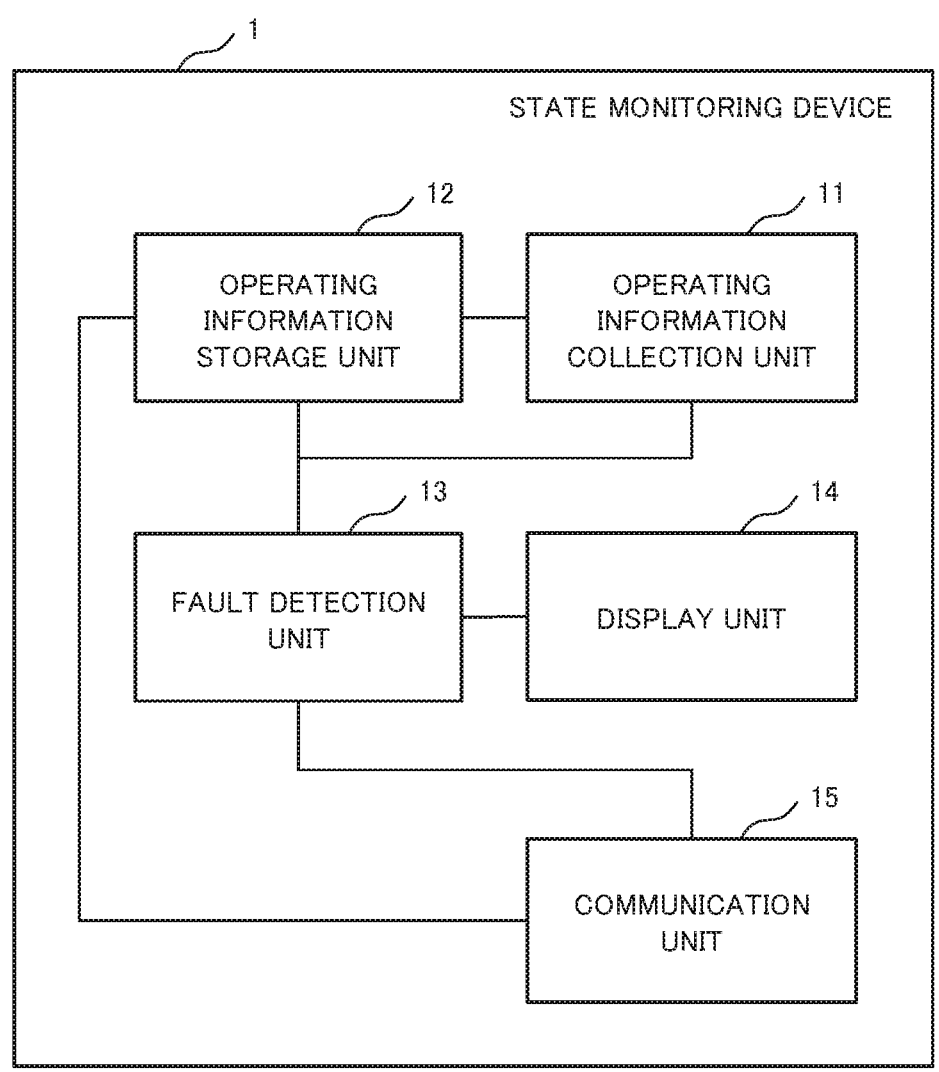
FIG. 2 is a diagram illustrating an internal configuration example of a state monitoring device.

As illustrated in FIG. 2, the state monitoring device 1 includes an operating information collection unit 11, an operating information storage unit 12, a fault detection unit 13, a display unit 14, and a communication unit 15.

The operating information collection unit 11 collects operating information (operating state information and fault information) of an apparatus to be monitored from a sensor attached to the apparatus to be monitored.

The operating information storage unit 12 stores operating information. The operating information includes operating state information and fault information. The operating state information is, for example, a real-time operating log of an apparatus to be monitored. The fault information is, for example, an error code and fault severity. In addition, the operating information includes an apparatus to be monitored identifier (ID), a time stamp, and a maintenance server address.

The operating log includes an event log, a set value log, and a measurement value log. The event log is a log indicating that some event occurs in an apparatus to be monitored. The set value log is a log indicating a set value set in an apparatus to be monitored when a schedule of an operation is set. The measurement value log is a real-time operating log of an apparatus to be monitored, and a measurement value of each of voltage, current and temperature falls under the measurement value log in a case of, for example, a power battery system.

The error code is, for example, a code or a numeric character string for identifying, when an error occurs in an apparatus to be monitored, a kind of the error.

The fault severity is information indicating a degree of a fault, and is classified into three ranks, for example, "severe", "slight", and "unknown". In a case of, for example, a power battery system, "severe" is a fatal failure concerning safety of a battery, such as overcharge, overdischarge, or overcurrent. In this case, a maintenance worker needs to immediately stop the system. "Slight" is, for example, a relay fault of a power conditioner, or a unit fault based on a detection result of a non-communication with a unit, and is a failure that needs automatic recovery. In this case, resetting of the unit needs to be attempted via a remote operation or autonomously. "Unknown" is a failure such as grid instantaneous overvoltage, a grid power abnormality in which a direct cause of a fault is unknown, but there is a need to stop an operation of a system and then wait temporarily. In this case, an external cause being a fault cause may be eliminated by waiting for a certain period. When a fault is not eliminated even by waiting for a certain period, the fault severity may be set in such a way as to be raised to "slight" or "severe". A content of the fault severity and the number of ranks are not limited to the above, and are changeable according to operating status of an apparatus to be monitored.

The apparatus to be monitored ID is an identifier for uniquely identifying an apparatus to be monitored.

The time stamp is a stamp indicating a time when operating information is generated.

The maintenance server address is a destination address of the maintenance server 3.

The fault detection unit 13 performs detection of a fault of an apparatus to be monitored and determination of fault severity, based on current operating information transmitted from the operating information collection unit 11 and past operating information acquired from the operating information storage unit 12.

The display unit 14 is a display device for displaying at least one of presence or absence of a fault, fault severity, and presence or absence of information transmission to the mobile object 2, and a display device or a lamp is equivalent to the display unit 14, for example.

The communication unit 15 executes a communication with the maintenance server 3 via the network 4. The communication unit 15 is capable of using a first communication line for transmitting operating information of an apparatus to be monitored to the maintenance server 3 when a communication is normal, and a second communication line for transmitting operating information to the maintenance server 3 via a wireless communication provided by the mobile object 2 when the first communication line is not communicable. When sensing that a communication via the first communication line is not possible for some reason, the communication unit 15 searches for the mobile object 2, and requests connection to a wireless communication provided by the mobile object 2. Further, the communication unit 15 may request the mobile object 2 for information (e.g., a position and a time of cutoff) relating to communication cutoff.

When performing a communication by using the second communication line, the communication unit 15 may measure communication quality in the second communication line, and select, based on a measurement result, operating information to be transmitted. In other words, the communication unit 15 may perform measurement of quality (such as a communication speed, a communication loss) of a communication with the mobile object 2 during mutual communication, and adjust, in consideration of the communication quality, a data amount of operating information to be transmitted. For example, the communication unit 15 performs transmission of a large data amount (operating state information and the like) when the communication quality is good, and transmits a small amount of data (fault information and the like) that may be important when the communication quality is poor. The communication quality includes quality of a communication between the state monitoring device 1 and the mobile object 2, and quality of a communication between the mobile object 2 and the maintenance server 3. In other words, since a communication between the state monitoring device 1 and the maintenance server 3 becomes possible when quality of a communication between the state monitoring device 1 and the mobile object 2 and quality of a communication between the mobile object 2 and the maintenance server 3 are equal to or more than given quality, the communication unit 15 determines a transmission data amount in consideration of a balance between both of the communications. This is intended to prevent a communication having poor communication quality from becoming a bottleneck, and a scheduled data amount from failing to be transmitted within a scheduled time as a result.

Furthermore, the communication unit 15 may adjust, in consideration of a communication speed and fault severity, a data amount to be transmitted. For example, as illustrated in FIG. 3, the state monitoring device 1 generates data of a table in which a data amount to be transmitted in a state of each cell is input in a cell within a table having a row of "fast", "normal", and "slow" representing communication speeds, and a column of "severe". "slight", and "unknown" representing fault severity, and previously stores the data in the operating information storage unit 12. The communication unit 15 determines, based on the data in the table, a data amount to be transmitted. The data in the table may be generated for a communication between the state monitoring device 1 and the mobile object 2, or may be generated for a communication between the mobile object 2 and the maintenance server 3.

(Mobile Object)

Figure 4:
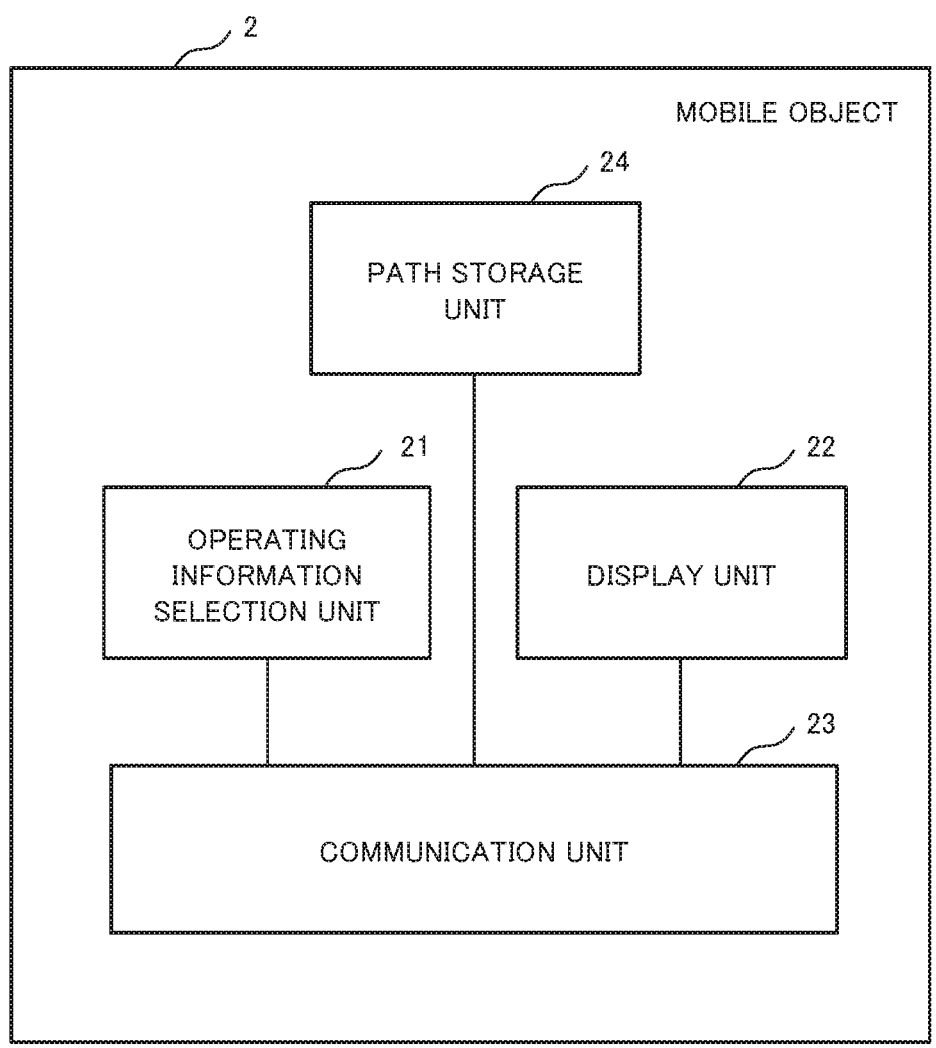
FIG. 4 is a diagram illustrating an internal configuration example of a mobile object.

As illustrated in FIG. 4, the mobile object 2 includes an operating information selection unit 21, a display unit 22, a communication unit 23, and a path storage unit 24.

The operating information selection unit 21 selects data to be transmitted to the maintenance server 3, out of operating information received from the state monitoring device 1. During the selection, fault severity included in the operating information, and a stability degree of a communication between the mobile object 2 and the maintenance server 3 may be considered.

The display unit 22 is a display or a lamp that displays information for identifying a faulty apparatus to be monitored, information for identifying the maintenance server 3 that should maintain the apparatus to be monitored, fault severity, and presence or absence of information transmission to the maintenance server 3.

The communication unit 23 transmits information selected by the operating information selection unit 21 to the maintenance server 3 side. The communication unit 23 may transfer, to the maintenance server 3, operating information received from the state monitoring device 1, as it is.

The path storage unit 24 stores a path where the mobile object 2 moves. It is assumed that a path where the mobile object 2 moves is previously set. Further, a path where the mobile object 2 moves may be received from the state monitoring device 1 or the maintenance server 3 via the communication unit 23.

A trigger with which the mobile object 2 starts movement to the state monitoring device 1 side is, for example, a case where it becomes a predetermined time (this time may be periodical). Otherwise, a fact that the communication unit 23 receives a request for wireless communication supply from the maintenance server 3 or the state monitoring device 1 sensing that the first communication is not possible may be a trigger with which the mobile object 2 starts movement.

(Maintenance Server)

Figure 5:
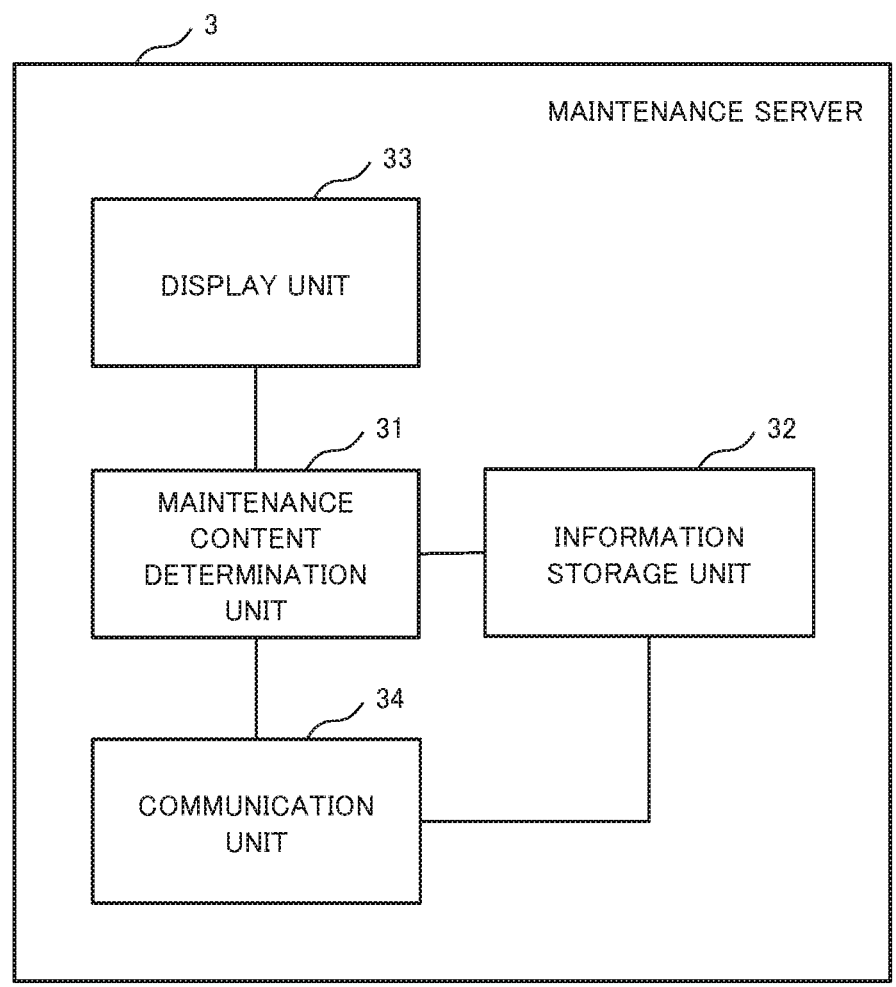
FIG. 5 is a diagram illustrating an internal configuration example of a maintenance server.

As illustrated in FIG. 5, the maintenance server 3 includes a maintenance content determination unit 31, an information storage unit 32, a display unit 33, and a communication unit 34.

The information storage unit 32 stores the above-described selected information received so far, operating information, and a history of information on maintenance executed based on the operating information.

The maintenance content determination unit 31 determines a current maintenance content (maintenance information), based on the above-described selected information received from the communication unit 34, and past operating information and past maintenance information of the apparatus to be monitored acquired from the information storage unit 32. The determined maintenance information is stored in the information storage unit 32

The display unit 33 is a display or a lamp that indicates, to a maintenance worker, an ID of an apparatus to be monitored having a possibility of a fault, presence or absence of a fault, fault severity, and maintenance information that are included in operating information.

The communication unit 34 receives selected information or operating information from the mobile object 2 (the state monitoring device 1 when in mutual communication). Further, the communication unit 34 transmits maintenance information to the mobile object 2 (the state monitoring device 1 when in mutual communication).

(Operation of State Monitoring System)

An operation of the state monitoring system 100 is described. For an operation of the state monitoring system 100, there are broadly "1. an operation when the first communication is possible between the state monitoring device 1 and the maintenance server 3, and "2. an operation when the second communication is executed between the state monitoring device 1 and the maintenance server 3 via the mobile object 2 in a case where the first communication is not possible". For 2, there are further "(2-1) an operation when operating information is periodically transmitted to the maintenance server 3 from the state monitoring device 1 via the mobile object 2", "(2-2) an operation when fault information is transmitted to the maintenance server 3 from the state monitoring device 1 via the mobile object 2 during occurrence of a fault", and "(2-3) an operation when information is transmitted to the state monitoring device 1 from the maintenance server 3 via the mobile object 2". The operation of (2-3) is an operation for setting and updating, by the maintenance server 3, a desired program in the state monitoring device 1 via a communication without a maintenance worker visiting an apparatus to be monitored during schedule setting or firmware update, and moreover, during fault occurrence. Since the operation of 1. can be executed with an existing communication technique, description thereof is omitted. Three operations executed by the state monitoring system 100 in 2. are described below with reference to a flowchart.

Figure 6:
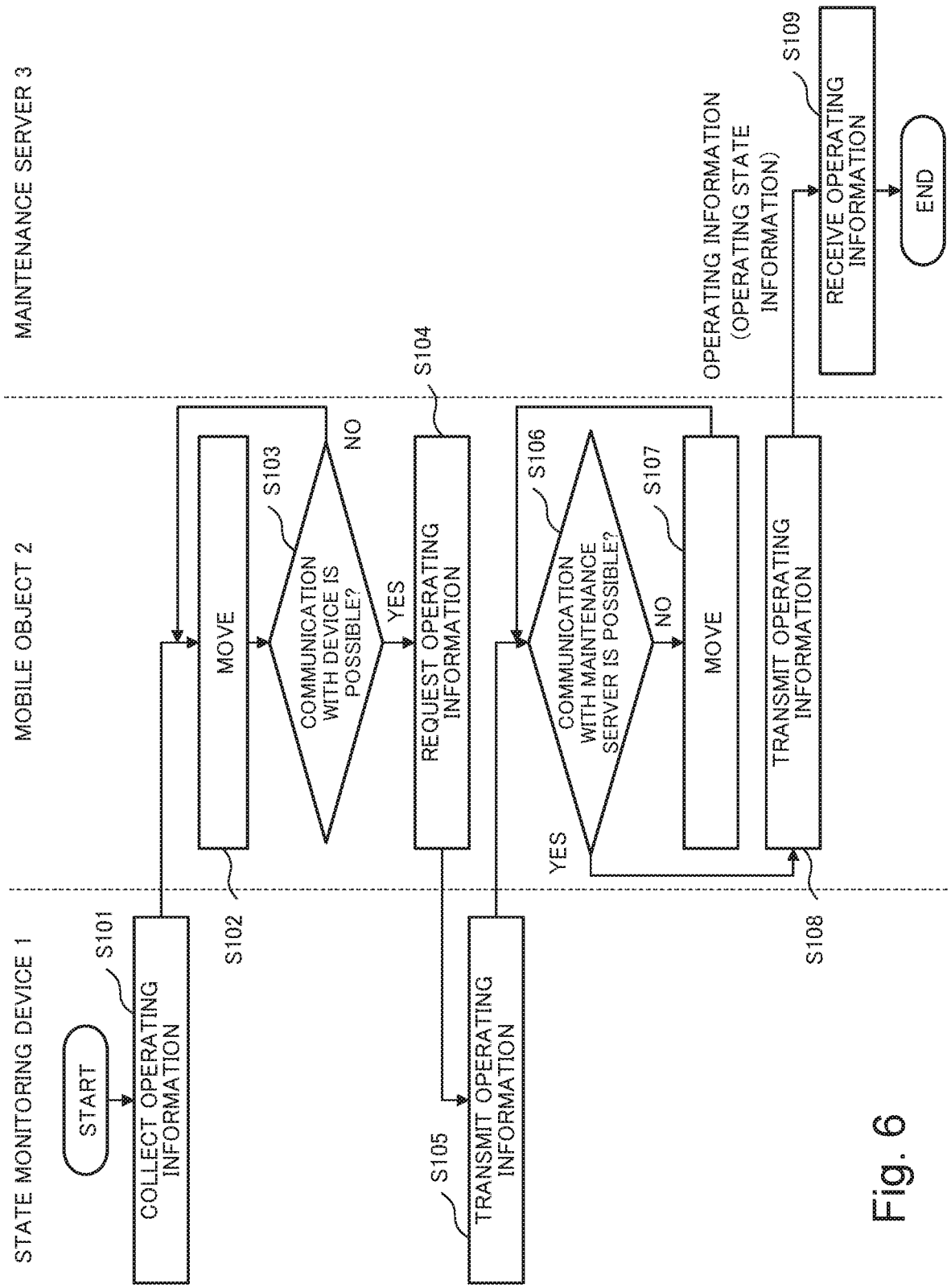
FIG. 6 is a flowchart illustrating an operation of periodically transmitting operating information to the maintenance server from the state monitoring device via a mobile object by a second communication line of the state monitoring system according to the first example embodiment.

(2-1) An operation when operating information (including at least operating state information) is periodically transmitted to the maintenance server 3 from the state monitoring device 1 via the mobile object 2 is described with reference to a flowchart in FIG. 6. The present operation is repeatedly performed at each previously set time interval.

First, in step S101, the operating information collection unit 11 of the state monitoring device 1 collects operating information of an apparatus to be monitored from sensor equipment attached to the apparatus to be monitored, and stores the operating information in the operating information storage unit 12, at each previously set interval or with occurrence of some abnormality as a trigger. The communication unit 15 may notify the mobile object 2 that new operating information is stored in the operating information storage unit 12.

In step S102, the mobile object 2 moves in a zone assigned in order to collect operating information, at each previously set predetermined interval, based on a path stored in the path storage unit 24. By this movement, the communication unit 23 of the mobile object 2 detects that a communication with the state monitoring device 1 is possible. When detecting in step S103 that a communication with the state monitoring device 1 is possible, the communication unit 23 of the mobile object requests the state monitoring device 1 for transmission of operating information via a wireless communication in step S104.

In step S105, the communication unit 15 of the state monitoring device 1 receiving the request acquires operating information stored in the operating information storage unit 12, and transmits the operating information to the mobile object 2 via a wireless communication.

In step S106, the mobile object 2 acquiring the operating information determines whether a wireless communication with the maintenance server 3 via the network 4 is possible. Processing is advanced to step S108 when it is determined that the wireless communication is possible, or processing is advanced to step S107 when it is determined that the wireless communication is not possible.

In step S107, the mobile object 2 moves to a position where a wireless communication with the maintenance server 3 via the network 4 is possible.

In step S108, the mobile object 2 transmits the operating information to the maintenance server 3 via the network 4.

In step S109, the maintenance server 3 receives the operating information via the network 4.

This ends the description of (2-1) an operation when operating information is periodically transmitted to the maintenance server 3 from the state monitoring device 1 via the mobile object 2.

Figure 7:
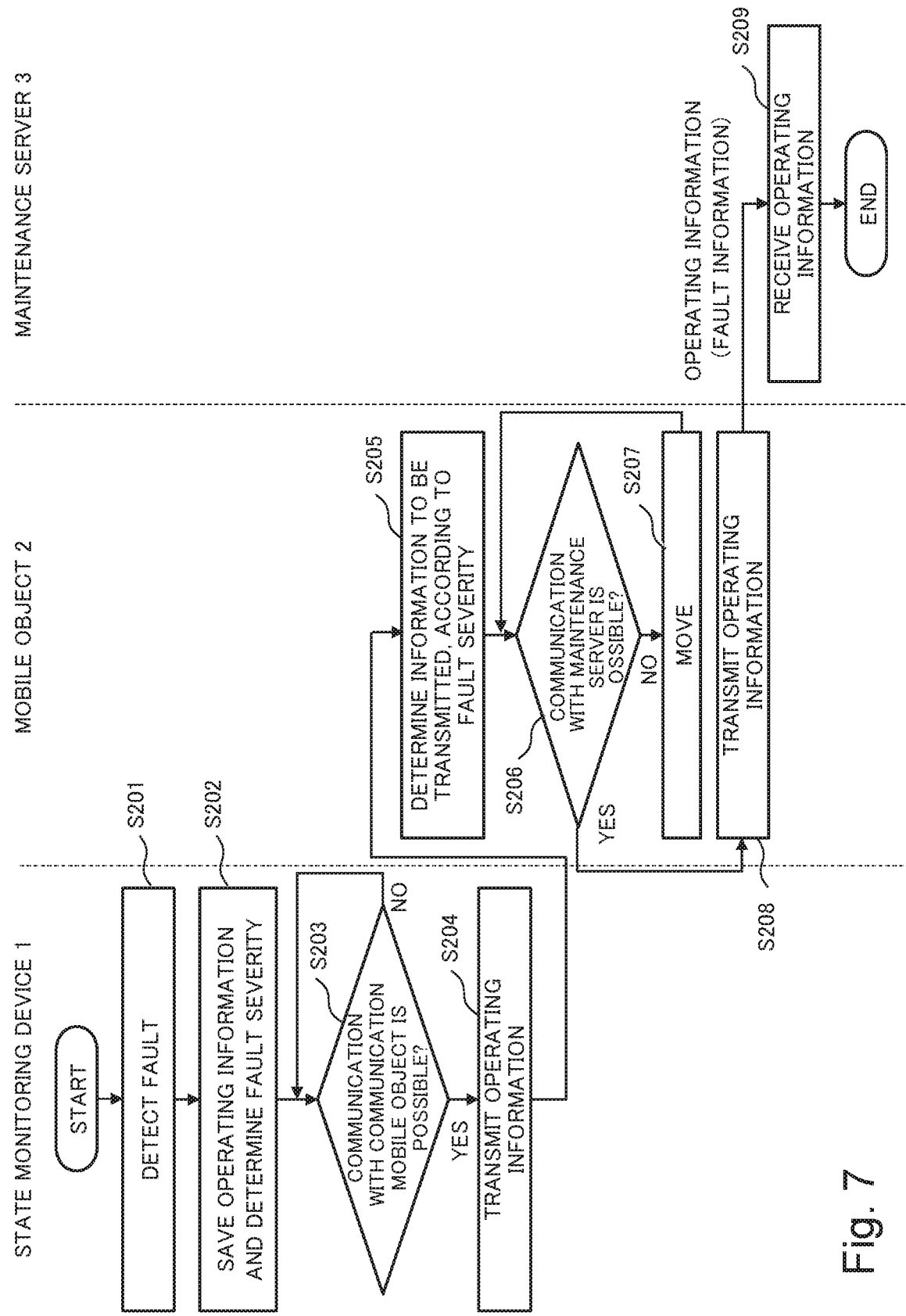
FIG. 7 is a flowchart illustrating an operation of transmitting fault information to the maintenance server from the state monitoring device via a mobile object by the second communication line of the state monitoring system according to the first example embodiment during occurrence of a fault.

(2-2) An operation when operating information (including at least fault information) is transmitted to the maintenance server 3 from the state monitoring device 1 via the mobile object 2 during occurrence of a fault is described with reference to a flowchart in FIG. 7.

First, in step S201, the fault detection unit 13 of the state monitoring device 1 compares current operating information transmitted from the operating information collection unit 11 with past operating information acquired from the operating information storage unit 12, and detects a fault of an apparatus to be monitored. For example, when a certain value rapidly increases or rapidly decreases as compared with a past value, the fault detection unit 13 determines that a fault occurs in an apparatus related to the value.

In step S202, the fault detection unit 13 stores, in the operating information storage unit 12, a determination result of fault detection and operating information serving as a basis for the fault detection. Further, the fault detection unit 13 determines fault severity, based on the determination result of fault detection and the operating information serving as a basis for the fault detection. For example, the fault detection unit 13 determines which of the above-described three ranks "severe". "slight", and "unknown" a detected fault applies to.

In step S203, the communication unit 15 of the state monitoring device 1 detects whether a communication with the mobile object 2 is possible. When it is detected that the communication is possible, processing is advanced to step S204. When it is detected that the communication is not possible, the communication unit 15 repeats detection until a communication with the mobile object 2 becomes possible.

In step S204, the communication unit 15 transmits operating information including fault severity to the mobile object 2.

In step S205, the operating information selection unit 21 of the mobile object 2 receiving the operating information acquires the fault severity included in the operating information, refers to data in the table illustrated in FIG. 3, and selects, according to the fault severity, operating information to be transmitted to the maintenance server 3 side. For example, the operating information selection unit 21 may cause the communication unit 23 of the mobile object 2 to measure a communication speed between the mobile object 2 and the maintenance server 3, and transmit all the operating information when the communication speed is equal to or more (faster) than a predetermined speed, or transmit a part of the operating information (operating state information only) when the communication speed is equal to or less (slower) than the predetermined speed.

In step S206, the communication unit 23 determines whether a wireless communication with the maintenance server 3 via the network 4 is possible. Processing is advanced to step S208 when it is determined that the wireless communication is possible, or processing is advanced to step S207 when it is determined that the wireless communication is not possible.

In step S207, the mobile object 2 moves to a position where a wireless communication with the maintenance server 3 via the network 4 is possible.

In step S208, the mobile object 2 transmits operating information to the maintenance server 3 via the network 4.

In step S209, the maintenance server 3 receives the operating information via the network 4.

This ends the description of (2-2) an operation when operating information (including at least fault information)

is transmitted to the maintenance server 3 from the state monitoring device 1 via the mobile object 2 during occurrence of a fault.

Figure 8:
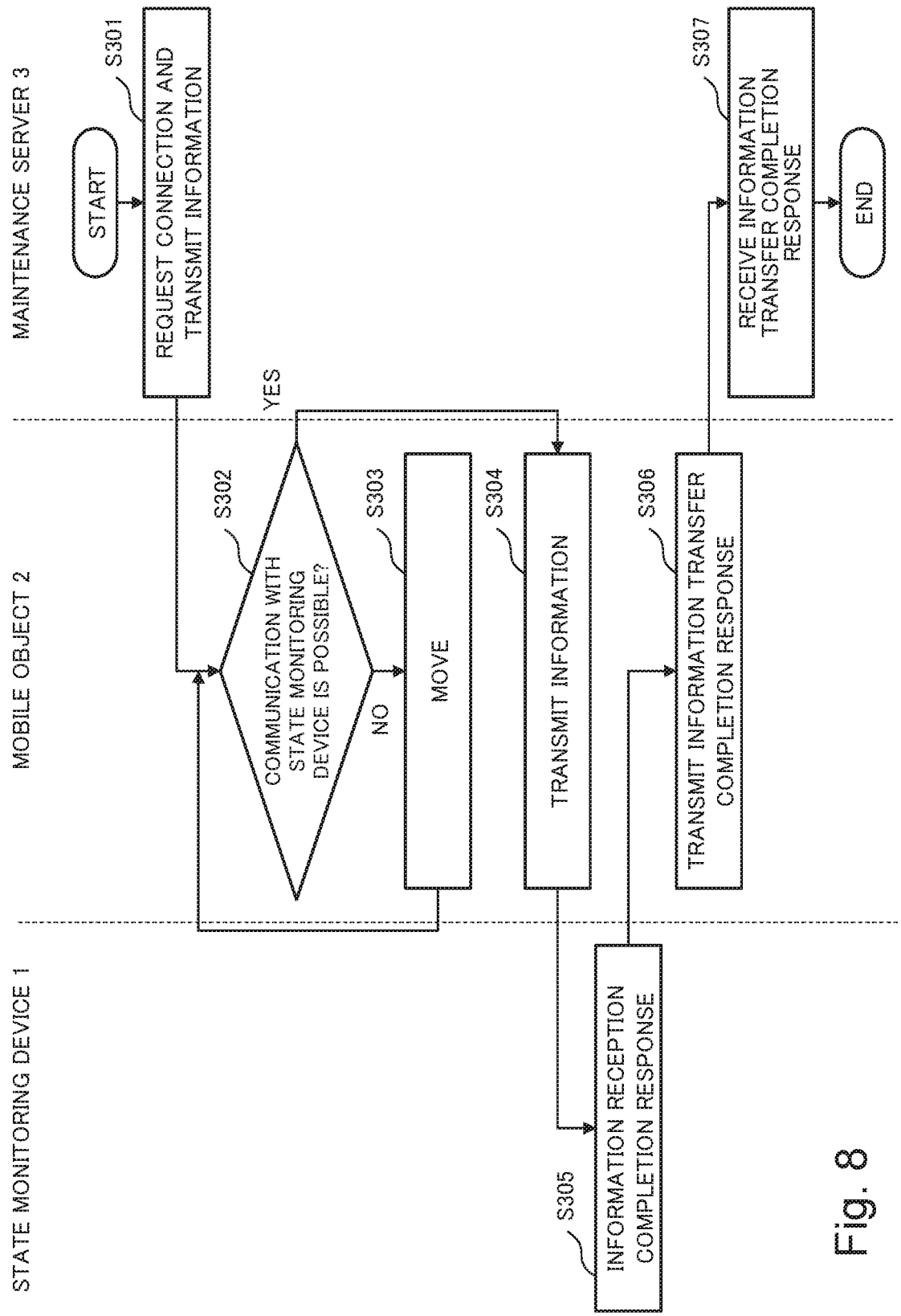
FIG. 8 is a flowchart illustrating an operation of transmitting information to the state monitoring device from the maintenance server via a mobile object by the second communication line of the state monitoring system according to the first example embodiment.

(2-3) An operation when information is transmitted to the state monitoring device 1 from the maintenance server 3 via the mobile object 2 is described with reference to a flowchart in FIG. 8. It is assumed that the maintenance server 3 stores, as a preparation, association of the state monitoring device 1 with the mobile object 2 assigned to the state monitoring device 1, and communication addresses thereof. It is also assumed that the maintenance server 3 is not capable of a direct communication with the state monitoring device 1.

In step S301, the communication unit 34 of the maintenance server 3 transmits a request for connection to the state monitoring device 1 and information to the mobile object 2 associated with the state monitoring device 1. The information is information of initial setting, or information for updating the state monitoring device 1 when a trouble occurs in the state monitoring device 1. The information for initial setting or for updating is, for example, firmware information or a demand response (DR) schedule. Alternatively, the information may be information for executing a maintenance content determined, based on operating information and fault severity included therein, by the maintenance content determination unit 31 when the operating information saying that a fault is detected from the state monitoring device 1 is received.

In step S302, the communication unit 23 of the mobile object 2 detects whether a wireless communication with the state monitoring device 1 is possible. Processing is advanced to step S304 when it is determined that the wireless communication is possible, or processing is advanced to step S303 when it is determined that the wireless communication is not possible.

In step S303, the mobile object 2 moves to a position where a wireless communication with the state monitoring device 1 is possible.

In step S304, the mobile object 2 transmits information to the state monitoring device 1 via the wireless communication.

In step S305, the communication unit 15 of the state monitoring device 1 transmits a response message indicating reception completion of the information to the mobile object 2 via the wireless communication. In step S306, the communication unit 23 of the mobile object 2 receiving the response message transmits a response message indicating that information transmission is completed, to the maintenance server 3 via the network 4.

In step S307, the maintenance server 3 receives the response message via the network 4.

This ends the description of an operation when information is transmitted to the state monitoring device 1 from the maintenance server 3 via the mobile object 2.

Advantageous Effect of First Example Embodiment

The state monitoring device 1 according to the first example embodiment of the present invention can certainly deliver, to a maintenance worker side, state monitoring information of an apparatus to be monitored disposed in a remote place where a communication environment is poor, A reason for this is that the state monitoring device 1 transmits operating information to the maintenance server 3 via a wireless communication provided by the mobile object 2 (the second communication line) when the first communication line for transmitting operating information of an apparatus to be monitored to a server device is not communicable.

Second Example Embodiment

Although there is one mobile object 2 according to the first example embodiment, a plurality of mobile objects 2 may be present. In other words, communication connection may be performed between a state monitoring device 1 and a maintenance server 3 via a wireless communication function included in the plurality of mobile objects 2. A distance which each of the mobile objects 2 moves can be shortened by performing a communication between the plurality of mobile objects 2 in this way, and as a result, information can be transmitted earlier. In a second example embodiment, a state monitoring system 200 that transmits information by use of a plurality of mobile objects 2 is described below.

(State Monitoring System)

Figure 9:
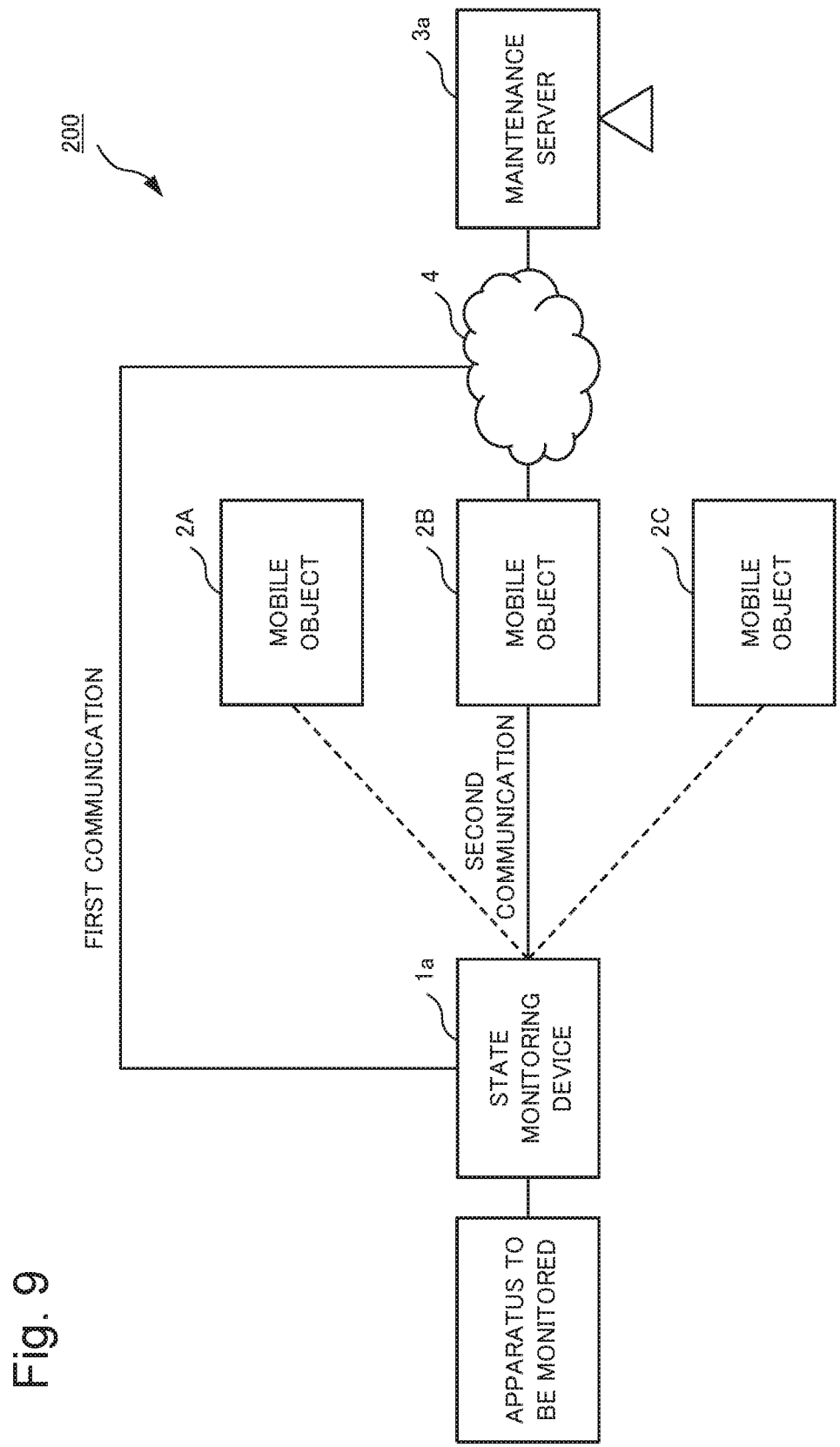
FIG. 9 is a block diagram illustrating a configuration example of a state monitoring system according to a second example embodiment of the present invention.

As illustrated in FIG. 9 (an overall system diagram), the state monitoring system 200 according to the second example embodiment includes a state monitoring device 1*a*, a plurality of mobile objects 2A, 2B, and 2C (hereinafter described as 2A to 2C), and a maintenance server 3*a*. The plurality of mobile objects 2A to 2C are communicable with one another. For example, the plurality of mobile objects 2A to 2C construct an ad-hoc network, and execute a direct communication in an ad-hoc mode.

One circulation area may be circulated by the plurality of mobile objects 2A to 2C, In this instance, circulation start times of the mobile objects 2A and 2B circulating on the same route may be staggered. For example, in an area where one circulation takes two minutes, circulation of the mobile object 2B may be started one minute after start circulation of the mobile object 2A. Thus, the state monitoring device 1*a* being present in the circulation area becomes communicable with the mobile objects 2A to 2C every minute. Otherwise, disposition of the mobile objects 2A to 2C in a circulation area may be adjusted in such a way that the mobile objects 2A to 2C are directly communicable with one another, and operating information transmitted by the state monitoring device 1*a* may be delivered to the maintenance server 3 by performance of direct communication among the mobile objects 2A to 2C.

Although an apparatus to be monitored and the state monitoring device 1*a* connected to the apparatus to be monitored are one set in FIG. 9, a plurality of such sets may be present. In this case, the plurality of mobile objects 2A to 2C move in such a way as to circulate the plurality of sets described above.

Figure 10:
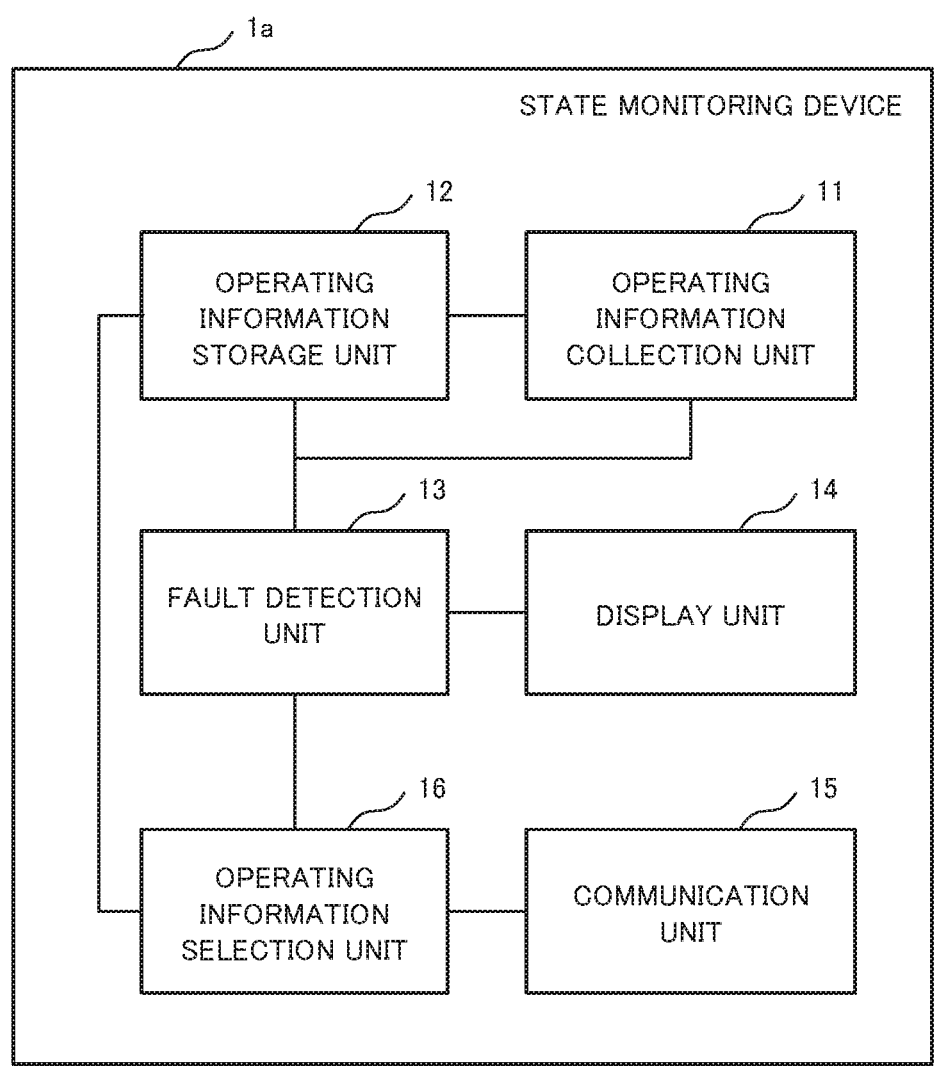
FIG. 10 is a diagram illustrating an internal configuration example of a state monitoring device.

As illustrated in FIG. 10, the state monitoring device 1*a* includes an operating information collection unit 11, an operating information storage unit 12, a fault detection unit 13, a display unit 14, a communication unit 15, and an operating information selection unit 16. The operating information selection unit 16 performs measurement of communication quality (such as a communication speed, a communication loss) for each of the communicable mobile objects 2A to 2C (a plurality of mobile objects may be present) received via the communication unit 15. The operating information selection unit 16 adjusts, in consideration of the communication quality, a data amount of operating information that is stored in the operating information storage unit 12, and that is to be transmitted. For example, a large amount of data (operating information) are transmitted to a mobile object having good communication quality, and a small amount of data (operating information) are transmitted to a mobile object having poor communication quality. Since an operating log (operating state information) generally becomes a large amount of data, the operating information selection unit 16 transmits the operating log by allocating the operating log to a mobile object having good communication quality. A function of each of the other units is similar to that according to the first example embodiment.

Figure 11:
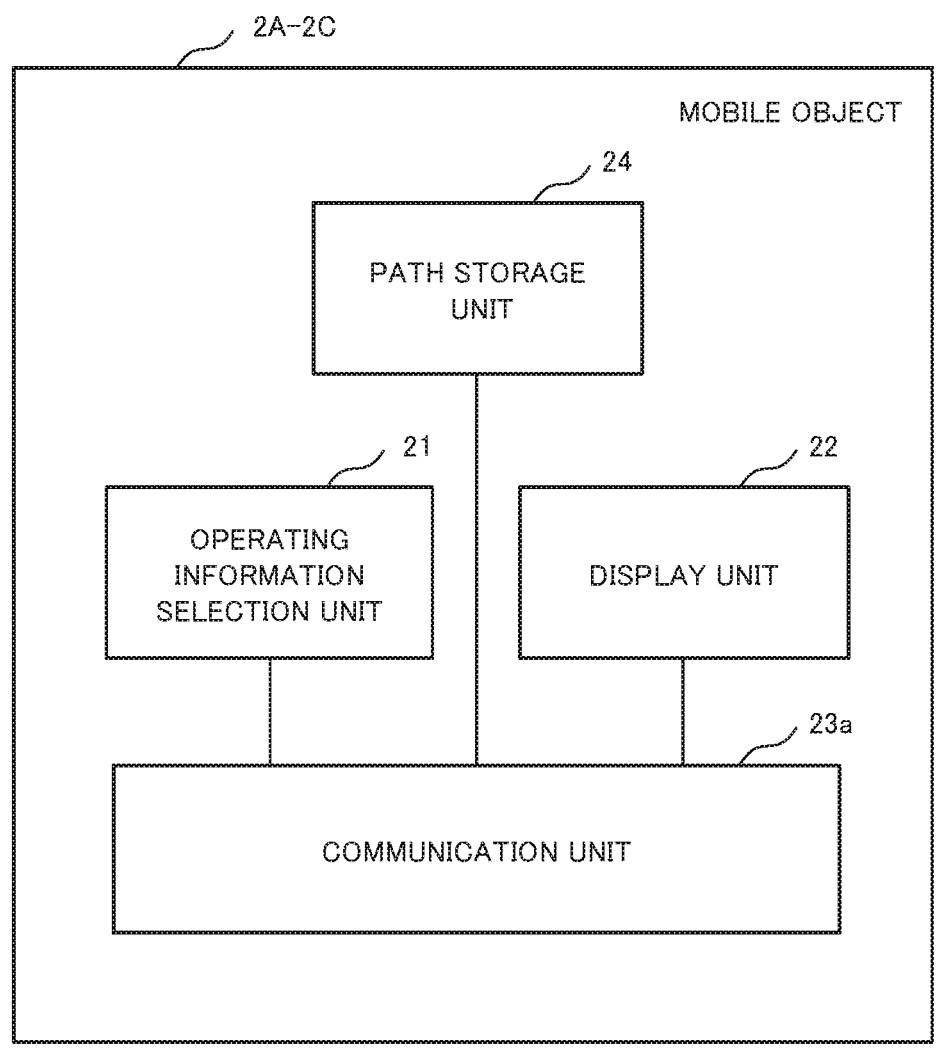
FIG. 11 is a diagram illustrating an internal configuration example of a mobile object.

As illustrated in FIG. 11, the mobile objects 2A to 2C each include an operating information selection unit 21, a display unit 22, and a communication unit 23a. The communication unit 23a is capable of a communication (e.g., an ad-hoc communication) with another mobile object. Other functions are similar to those according to the first example embodiment.

Figure 12:
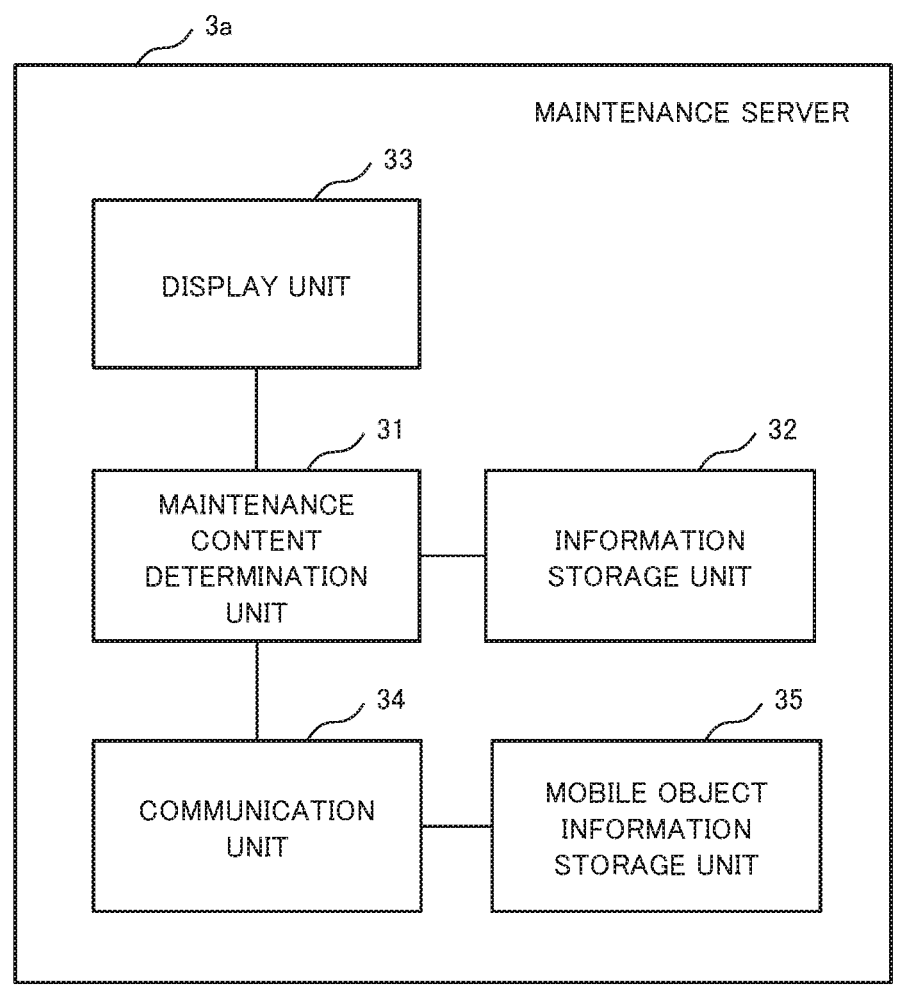
FIG. 12 is a diagram illustrating an internal configuration example of a maintenance server.

As illustrated in FIG. 12, the maintenance server 3a includes an information storage unit 32, a maintenance content determination unit 31, a display unit 33, a communication unit 34, and a mobile object information storage unit 35. The mobile object information storage unit 35 stores information relating to the mobile objects 2A to 2C. The information relating to the mobile objects 2A to 2C includes, for example, information with which each of the mobile objects 2A to 2C is identifiable, a history of communication quality of each of the mobile objects 2A to 2C, a circulation area allocated to each of the mobile objects 2A to 2C, the state monitoring device 1a being present in the circulation area, a history of communication cutoff with the state monitoring device 1a, information for identifying the state monitoring device 1a in which communication is cut off, a time for which communication is not possible. A function of each of the other units is similar to that according to the first example embodiment.

(Operation of State Monitoring System)

An operation of the state monitoring system 200 is described. For an operation of the state monitoring system 200, there are broadly "1. an operation when a first communication is possible between the state monitoring device 1a and the maintenance server 3a, and "2. an operation when a second communication is performed between the state monitoring device 1a and the maintenance server 3a via the mobile objects 2A and 2B in a case where the first communication is not possible". For 2, there are further "(2-4) an operation when each of the mobile objects 2A and 2B transmits data on operating information by adjusting, according to communication quality of each of the mobile objects 2A and 2B, an amount of data to be transmitted, at a time of transmitting the operating information of the state monitoring device 1a to the maintenance server 3a via the plurality of mobile objects 2A and 2B", and (2-5) an operation when operating information is transferred and transmitted between the mobile objects 2A and 2B, at a time of transmitting the operating information of the state monitoring device 1a to the maintenance server 3a via the plurality of mobile objects 2A and 2B. Since the operation of 1. can be executed with an existing communication technique, description thereof is omitted. Two operations executed by the state monitoring system 200 in 2. are described below with reference to a flowchart.

Figure 13:
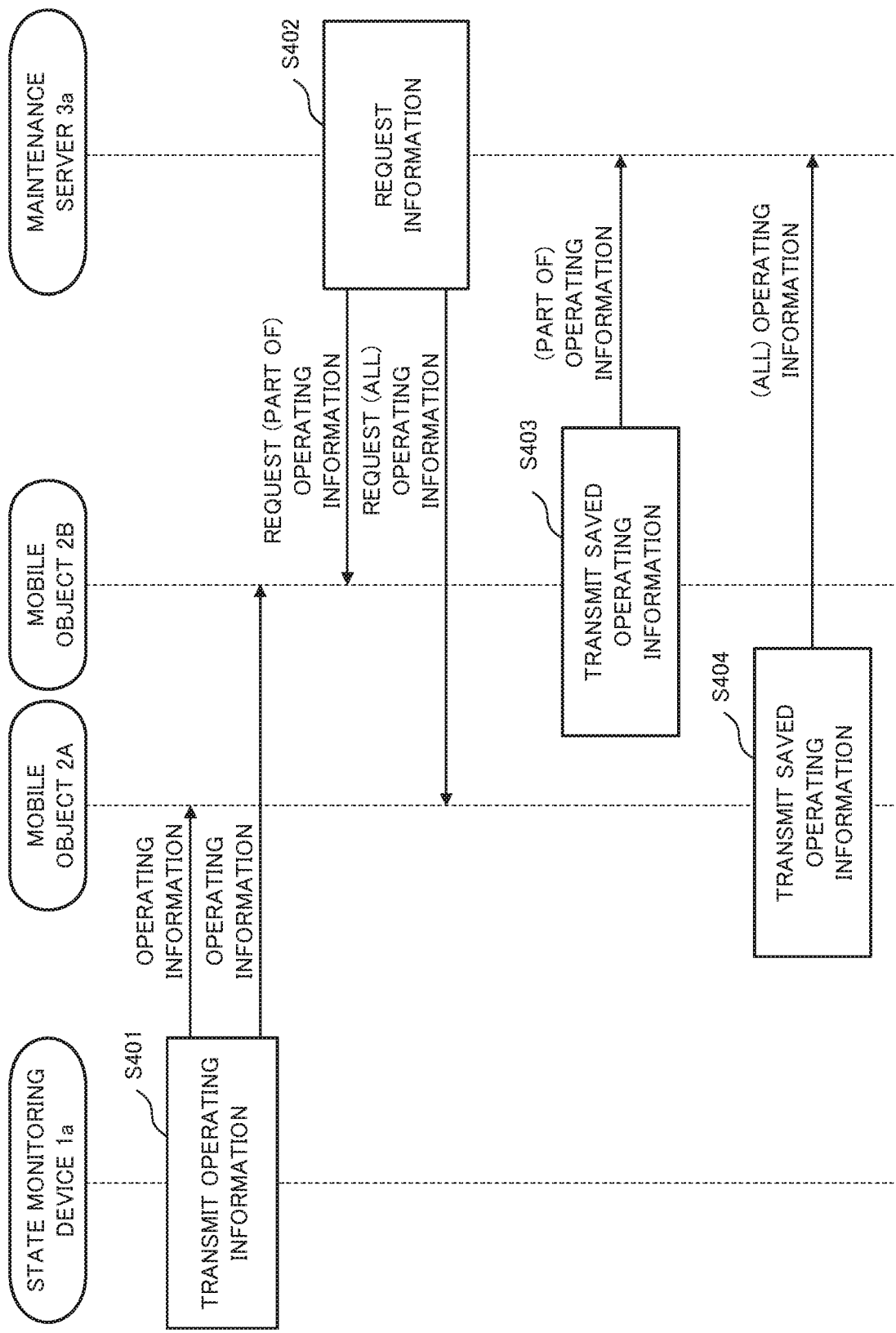
FIG. 13 is a flowchart illustrating an operation of transmitting, to the maintenance server, operating information of the state monitoring device via a plurality of mobile objects, while adjusting a data amount, by a second communication line of the state monitoring system according to the second example embodiment.

(2-4) An operation when each of the mobile objects 2A and 2B transmits data on operating information by adjusting, according to communication quality of each of the mobile objects 2A and 2B, an amount of data to be transmitted, at a time of transmitting the operating information of the state monitoring device 1a to the maintenance server 3a via the plurality of mobile objects 2A and 2B is described with reference to a flowchart in FIG. 13.

First, in step S401, the communication unit 15 of the state monitoring device 1a transmits operating information to the mobile objects 2A and 2B via a wireless communication provided by each of the mobile objects 2A and 2W Specifically, the operating information collection unit 11 of the state monitoring device 1a collects operating information of an apparatus to be monitored and then stores the operating information in the operating information storage unit 12. The communication unit 15 transmits the operating information stored in the operating information storage unit 12 to the mobile objects 2A and 2B via a wireless communication, at each predetermined interval or with a transmission request transmitted from each of the mobile objects 2A and 2B as a trigger. Each of the mobile objects 2A and 2B temporarily saves the operating information individually.

In step S402, the maintenance server 3a requests the mobile objects 2A and 2B for transmission of operating information, in consideration of communication quality. In consideration of the communication quality, determination is made based on, for example, a history of quality of a communication with each of the mobile objects 2A and 2B stored in the mobile object information storage unit 35. For example, when, in the history of communication quality, communication quality between the maintenance server 3a and the mobile object 2A is good and communication quality between the maintenance server 3a and the mobile object 2B is poor, the maintenance server 3a requests the mobile object 2A to transmit all operating information (including an operating log), and requests the mobile object 2B to transmit a part (including at least fault information) of operating information. In addition, during transmission request of operating information, the communication unit 34 of the maintenance server 3a may measure communication quality between the mobile objects 2A and 2B, determine communication quality, based on a result of the measurement, and determine a content of operating information which each of the mobile objects 2A and 2B is requested to transmit.

In step S403, the mobile object 2B receives transmission request of operating information from the maintenance server 3a. The mobile object 2B selects, from temporarily saved operating information, the operating information (in this case, partial operating information) requested to transmit, and transmits the operating information to the maintenance server 3a via a network 4.

In step S404, the mobile object 2A receives a transmission request of operating information from the maintenance server 3a. The mobile object 2A acquires, from temporarily saved operating information, the operating information (in this case, all operating information) requested to transmit, and transmits the operating information to the maintenance server 3a via a network 4.

This ends the description of an operation when each of the mobile objects 2A and 2B transmits data on operating information by adjusting, according to communication quality of each of the mobile objects 2A and 2B, an amount of data to be transmitted, at a time of transmitting the operating information of the state monitoring device 1a to the maintenance server 3a via the plurality of mobile objects 2A and 2B.

Figure 14:
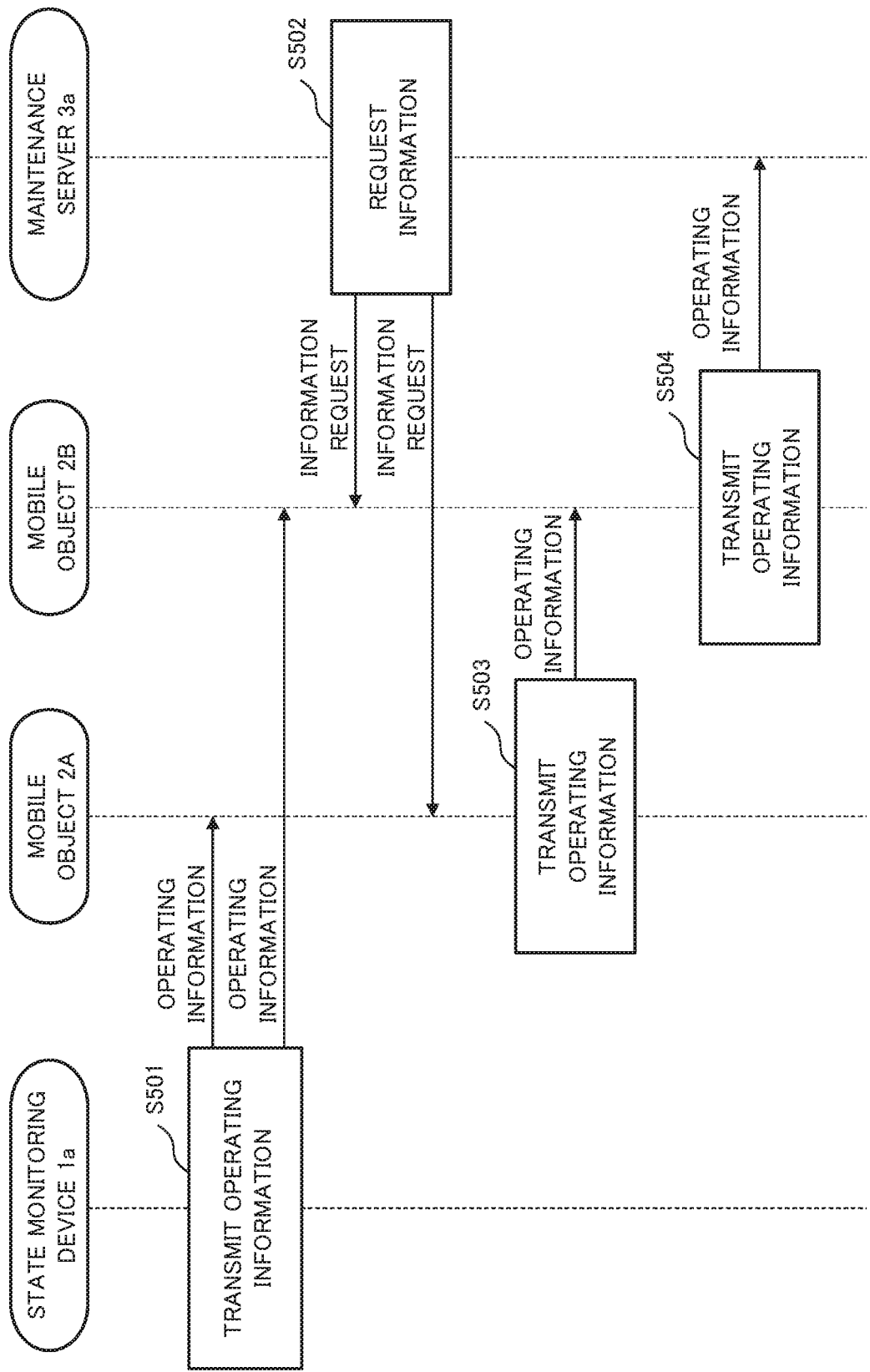
FIG. 14 is a flowchart illustrating an operation of transmitting, to the maintenance server, operating information of the state monitoring device by transferring the operating information between a plurality of mobile objects, by a second communication line of the state monitoring system according to the second example embodiment.

(2-5) An operation when operating information is transferred and transmitted between the mobile objects 2A and 2B, at a time of transmitting the operating information of the state monitoring device 1a to the maintenance server 3a via the plurality of mobile objects 2A and 2B is described with reference to a flowchart in FIG. 14.

In step S501, the communication unit 15 of the state monitoring device 1a transmits operating information to the mobile objects 2A and 2B via a wireless communication provided by each of the mobile objects 2A and 2B. Each of the mobile objects 2A and 2B temporarily saves the operating information individually. At this point, communication quality between the state monitoring device 1a and each of the mobile objects 2A and 2B is not considered. Description is given below on a premise that communication quality between the state monitoring device 1a and the mobile object 2A is good, and communication quality between the state monitoring device 1a and the mobile object 23 is poor.

In step S502, the maintenance server 3a requests the mobile objects 2A and 2B for transmission of operating information. At this point, the maintenance server 3a side does not consider goodness or poorness of communication quality between the maintenance server 3a and each of the mobile objects 2A and 2B. When receiving the transmission request of the operating information, the communication unit 23a of each of the plurality of mobile objects 2A and 2B starts direct wireless communication with each other. For example, the communication unit 23a switches to the ad-hoc mode, and constructs an ad-hoc network.

In step S503, the mobile object 2A transmits, to the mobile object 2B, operating information temporarily saved. Specifically, the communication unit 23a of each of the plurality of mobile objects 2A and 2B detects a mobile object (the mobile object 2A in FIG. 14) having the best quality of a communication with the state monitoring device 1a in the ad-hoc network, and a mobile object (the mobile object 2B in FIG. 14) having the best quality of a communication with the maintenance server 3a. Further, the communication unit 23a causes the mobile object 2A to transmit the operating information temporarily saved by the mobile object 2A to the mobile object 2B having the best quality of a communication with the maintenance server 3a side. This transmission is performed in an ad-hoc communication.

In step S504, the mobile object 2B transmits the received operating information to the maintenance server 3a via the network 4, This ends the description of an operation when operating information is transferred and transmitted between the mobile objects 2A and 2B, at a time of transmitting the operating information of the state monitoring device 1a to the maintenance server 3a via the plurality of mobile objects 2A and 2B.

Advantageous Effect of Second Example Embodiment

The state monitoring device 1a according to the second example embodiment of the present invention can certainly deliver, to a maintenance worker side more quickly than in the first example embodiment, state monitoring information of an apparatus to be monitored disposed in a remote place where a communication environment is poor. A reason for this is that the state monitoring device 1a transmits operating information to the maintenance server 3a via a wireless communication provided by each of the plurality of mobile objects 2A to 2C (a second communication line) when a first communication line for transmitting operating information of an apparatus to be monitored to a server device is not communicable. Specifically, since a distance which each of the mobile objects 2A to 2C moves can be shortened, a movement time can be shortened, and information can be transmitted earlier.

Third Example Embodiment

Figure 15:
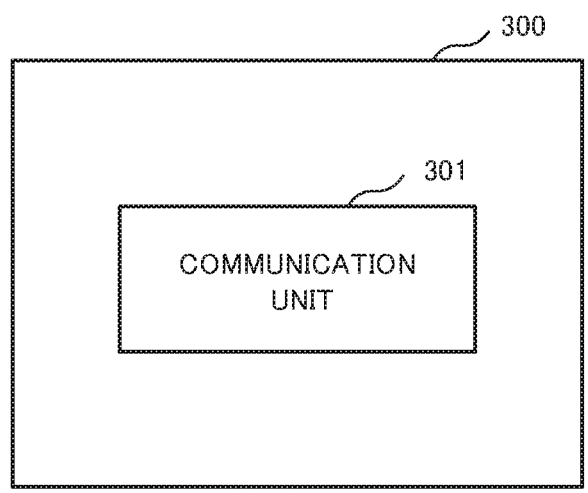
FIG. 15 is a block diagram illustrating a configuration example of a state monitoring system according to a third example embodiment of the present invention.

As illustrated in FIG. 15, a state monitoring system 300 according to a third example embodiment of the present invention includes a communication unit 301. The communication unit 301 performs communication by using a first communication line for transmitting, to a server device, operating information of a target apparatus to be monitored, and a second communication line for transmitting the operating information to the server device via a wireless communication provided by a mobile object when the first communication line is not communicable.

According to the third example embodiment of the present invention, state monitoring information of an apparatus to be monitored disposed in a remote place where a communication environment is poor can be certainly delivered to a maintenance worker side. A reason for this is that the communication unit 301 transmits operating information to the server device via a wireless communication provided by a mobile object when the first communication line is not communicable.

(Information Processing Device)

Figure 16:
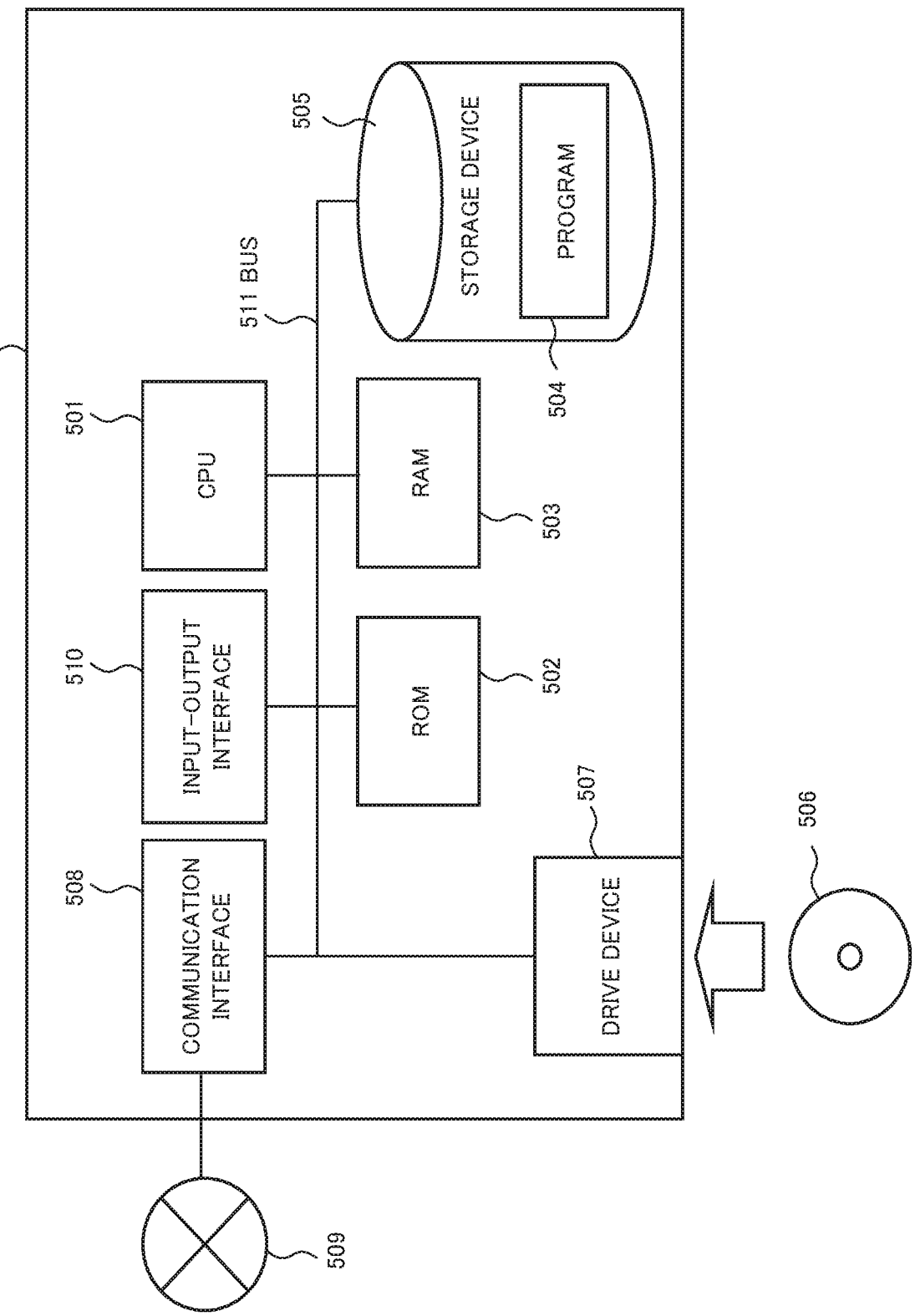
FIG. 16 is a block diagram illustrating a configuration example of an information processing device being applicable in each example embodiment.

In each of the example embodiments of the present invention described above, it is also possible to achieve a part or all of components of each unit (a state monitoring device, a mobile object, or a maintenance server) in the state monitoring system illustrated in FIG. 1, by use of any combination of an information processing device 500 and a program as illustrated in FIG. 16, for example. The information processing device 500 includes the following configuration as one example.

central processing unit (CPU) 501
    read only memory (ROM) 502
    random access memory (RAM) 503
    storage device 505 storing a program 504 and another piece of data.
    drive device 507 that performs reading and writing of a recording medium 506
    communication interface 508 that connects to a communication network 509
    input-output interface 510 that inputs and outputs data
    bus 511 that connects each component Each component of the state monitoring system according to each example embodiment of the present invention is achieved by acquiring and executing, by the CPU 501, the program 504 that achieves a function of the component. The program 504 that achieves the function of the component of each unit in the state monitoring system is previously stored in, for example, the storage device 505 or the RAM 503, and read by the CPU 501 as needed. The program 504 may be supplied to the CPU 501 via the communication network 509, or may be previously stored in the recording medium 506, read by the drive device 507, and then supplied to the CPU 501.

There are various modification examples of a method of achieving each device. For example, a component of each unit in the state monitoring system may be achieved by any combination of an information processing device and a program separate for each component. A plurality of components included in the state monitoring system may be achieved by any combination of one information processing device 500 and a program.

A part or all of components of each unit in the state monitoring system are achieved by another general-purpose or dedicated circuit, a processor, or a combination thereof. The components may be constituted of a single chip, or may be constituted of a plurality of chips connected via a bus.

A part or all of components of each unit in the state monitoring system may be achieved by a combination of the above-described circuit and a program.

When a part or all of components of each unit in the state monitoring system may be achieved by a plurality of information processing devices, circuits, or the like, the plurality of information processing devices, circuits may be centralizedly disposed or may be distributedly disposed. For example, the information processing devices, circuits may be achieved as a form such as a client-and-server system, a cloud computing system, in which each of the information processing devices, circuits is connected via a communication network.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2018-051208, filed on Mar. 19, 2018, the disclosure of which is incorporated herein in its entirety by reference.

REFERENCE SIGNS LIST

1 State monitoring device
1a State monitoring device
2 Mobile object
2A, 2B, 2C Mobile object
3 Maintenance server
3a Maintenance server
4 Network
11 Operating information collection unit
12 Operating information storage unit
13 Fault detection unit
14 Display unit
15 Communication unit
16 Operating information selection unit
21 Operating information selection unit
22 Display unit
23 Communication unit
23a Communication unit
31 Maintenance content determination unit
32 Information storage unit
33 Display unit
34 Communication unit
35 Mobile object information storage unit
100 State monitoring system
200 State monitoring system
300 State monitoring device
301 Communication unit
500 Information processing device
501 CPU
502 ROM
503 RAM
504 Program
505 Storage device
506 Recording medium
507 Drive device
508 Communication interface
509 Communication network
510 Input-output interface
511 Bus

The invention claimed is:

1. A state monitoring device comprising:
a processor; and
a memory having stored therein computer instructions, the instructions causing the processor to act as:
a communication unit configured to perform a communication by using
a first communication line for transmitting, to a server device, operating information of a target apparatus to be monitored, and
a second communication line for transmitting the operating information to the server device via a wireless communication provided by a mobile object when the first communication line is not communicable,
wherein:
the operating information includes operating state information of the target apparatus and fault information indicating fault severity of the target apparatus,
the communication unit performs a communication by using the second communication line, measures communication quality including a communication speed in the second communication line, and determines an amount of data to be transmitted based on the communication speed of a measurement result, and the fault severity indicated by the fault information, and selects data to be transmitted based on the determined amount of data from the operating information,
the target apparatus is a power battery system,
the fault severity is information indicating a degree of a fault, and is classified into three ranks: a severe rank, a slight rank, and an unknown rank,
the severe rank indicates a fatal failure concerning safety of a battery of the power battery system of at least one of overcharge, overdischarge, and overcurrent,
the slight rank indicates a relay fault of a power conditioner of the power battery system and is a failure that requires automatic recovery, and
the unknown rank indicates a failure where a cause of the failure is unknown, and a failure that there is a need to stop an operation of the power battery system and then wait temporarily.

2. The state monitoring device according to claim 1, wherein,
when detecting that the first communication line is not communicable, the communication unit requests the mobile object for connection to the wireless communication.

3. The state monitoring device according to claim 1, wherein the communication quality includes at least one of communication quality between the state monitoring device and the mobile object, and communication quality between the mobile object and the server device.

4. The state monitoring device according to claim 1, wherein a plurality of the mobile objects is present, and the instructions cause the processor to further act as:
an operating information selection unit configured to measure communication quality of each of a plurality of the mobile objects, and select, based on the measured communication quality, one or more mobile objects to request for transmission of the operating information and a content of the operating information to be transmitted to each of the one or more mobile objects.

5. A state monitoring system comprising:
the state monitoring device according to claim 1;
the mobile object that connects via the wireless communication by moving to a position where the wireless communication with the state monitoring device is possible, when the operating information of a target apparatus to be monitored by the state monitoring device is not transmittable via the first communication line; and the server device that receives the operating information between a local device and the state monitoring device via the second communication line using the wireless communication.

6. The state monitoring system according to claim 5, wherein, when the operating information of the target apparatus to be monitored by the state monitoring device is not transmittable via the first communication line, the mobile object transmits the operating information by moving to a position being communicable with the server device.

7. The state monitoring system according to claim 5, wherein, when a plurality of the mobile objects is directly communicable with one another, and a communication with the state monitoring device in the first communication line is not possible from the server device, a communication is performed in the second communication line using a first mobile object that receives the operating information from the state monitoring device via the wireless communication, and a second mobile object that receives, via a direct communication, the operating information received by the first mobile object, and transmits the received operating information to the server device via the wireless communication.

8. A state monitoring method comprising:

performing a communication by using:

a first communication line for transmitting, to a server device, operating information of a target apparatus to be monitored which includes operating state information of the target apparatus and fault information indicating fault severity of the target apparatus, and a second communication line for transmitting the operating information to the server device via a wireless communication provided by a mobile object when the first communication line is not communicable; and performing a communication by using the second communication line, measuring communication quality including a communication speed in the second communication line, determining amount of data to be transmitted based on the communication speed of a measurement result, and the fault severity indicated by the fault information, and selecting data to be transmitted based on the determined amount of data from the operating information, wherein the target apparatus is a power battery system, the fault severity is information indicating a degree of a fault, and is classified into three ranks: a severe rank, a slight rank, and an unknown rank, the severe rank indicates a fatal failure concerning safety of a battery of the power battery system of at least one of overcharge, overdischarge, and overcurrent, the slight rank indicates a relay fault of a power conditioner of the power battery system and is a failure that requires automatic recovery, and the unknown rank indicates a failure where a cause of the failure is unknown, and a failure that there is a need to stop an operation of the power battery system and then wait temporarily.

9. The state monitoring device according to claim 2, wherein a plurality of the mobile objects is present, and the instructions cause the processor to further act as:

an operating information selection unit configured to measure communication quality of each of the plurality of the mobile objects, and select, based on the measured communication quality, one or more mobile objects to request for transmission of the operating information and a content of the operating information to be transmitted to each of the one or more mobile objects.

10. The state monitoring device according to claim 3, wherein a plurality of the mobile objects is present, and the instructions cause the processor to further act as:

an operating information selection unit configured to measure communication quality of each of the plurality of the mobile objects, and select, based on the measured communication quality, one or more mobile objects to request for transmission of the operating information and a content of the operating information to be transmitted to each of the one or more mobile objects.

11. The state monitoring device according to claim 1, wherein, when performing a communication by using the second communication line, the communication unit measures the communication quality including the communication speed in the second communication line, selects all the operating information when the communication speed is equal to or more than a predetermined speed, determines the amount of data to be transmitted based on the fault severity indicated by the fault information when the communication speed is less than the predetermined speed, selects data to be transmitted based on the determined amount of data from the operating information.

* * * * *